United States Patent
Chen et al.

(10) Patent No.: US 11,650,060 B2
(45) Date of Patent: May 16, 2023

(54) COORDINATION MANAGEMENT OF MULTIPLE VEHICLES

(71) Applicant: International Business Machines Corporation, Armonk, NY (US)

(72) Inventors: Bei Chen, Blanchardstown (IE); Adi I. Botea, Dublin (IE); Akihiro Kishimoto, Dublin (IE); Beat Buesser, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/674,008

(22) Filed: Nov. 5, 2019

(65) Prior Publication Data
US 2021/0131813 A1    May 6, 2021

(51) Int. Cl.
*G01C 21/34*   (2006.01)
*G05D 1/02*    (2020.01)
(Continued)

(52) U.S. Cl.
CPC ....... *G01C 21/3415* (2013.01); *G05D 1/0027* (2013.01); *G05D 1/02* (2013.01);
(Continued)

(58) Field of Classification Search
None
See application file for complete search history.

(56) References Cited

U.S. PATENT DOCUMENTS 9,141,112 B1 *   9/2015   Loo .................. G08G 1/096866
9,262,926 B2 *   2/2016   Goldberg ................. G08G 1/22
(Continued)

FOREIGN PATENT DOCUMENTS

JP      10307997 A     11/1998
JP       6116743 B1    4/2017

OTHER PUBLICATIONS

Botea et al., "Moving Target Search with Compressed Path Databases", Copyright © 2013, Association of the Advancement of Artificial Intelligence (www.aaai.org), 5 pages.
(Continued)

*Primary Examiner* — Dale W Hilgendorf
*Assistant Examiner* — Hana Lee
(74) *Attorney, Agent, or Firm* — Joseph P. Curcuru

(57) ABSTRACT

Embodiments describe an approach for coordinating the travel of multiple vehicles traveling to a target destination, the embodiments describe generating a travel group, receiving travel group parameters from travel group members, synced GPS applications, and a weather application, generating a course of travel for the travel group members to reach a destination, and tracking each travel group member according to locations identified by the synced GPS applications. Additionally, embodiments describe determining that a subgroup of the travel group is no longer traveling within a pre-determined range of other travel group members; calculating an optimized course of travel for the subgroup to reunite with the other travel group members, adjusting the course of travel to include the optimized course of action for the subgroup, and causing each GPS application to direct the subgroup to travel according to the optimized course of travel.

20 Claims, 3 Drawing Sheets

(51) Int. Cl.
  *G05D 1/00* (2006.01)
  *G08G 1/00* (2006.01)
(52) U.S. Cl.
  CPC ......... *G05D 1/0291* (2013.01); *G05D 1/0293* (2013.01); *G08G 1/20* (2013.01); *G08G 1/22* (2013.01)

(56) References Cited

U.S. PATENT DOCUMENTS

| | | | |
|---|---|---|---|
| 9,940,840 B1* | 4/2018 | Schubert | B60F 1/00 |
| 10,108,202 B1* | 10/2018 | Aikin | B60L 53/14 |
| 10,719,084 B2* | 7/2020 | Yoon | H04L 43/08 |
| 2014/0282093 A1* | 9/2014 | Burke | H04W 4/023 |
| | | | 715/753 |
| 2016/0054735 A1* | 2/2016 | Switkes | H04W 4/44 |
| | | | 701/23 |
| 2016/0163200 A1* | 6/2016 | He | G08G 1/22 |
| | | | 701/117 |
| 2016/0362048 A1* | 12/2016 | Matthews | G08G 1/163 |
| 2017/0293296 A1* | 10/2017 | Stenneth | G06Q 20/10 |
| 2018/0018882 A1* | 1/2018 | Joyson | G08G 5/0013 |
| 2018/0188746 A1* | 7/2018 | Lesher | G08G 1/22 |
| 2018/0195874 A1* | 7/2018 | Andrew | G01C 21/3679 |
| 2019/0035284 A1* | 1/2019 | Tam | G05D 1/0297 |
| 2019/0162546 A1* | 5/2019 | Duale | G06Q 50/30 |
| 2019/0171227 A1* | 6/2019 | Sujan | B60W 10/06 |
| 2020/0080853 A1* | 3/2020 | Tam | G05D 1/0212 |
| 2020/0125086 A1* | 4/2020 | Switkes | G05D 1/0027 |
| 2020/0174496 A1* | 6/2020 | Hase | G05D 1/0285 |
| 2020/0298882 A1* | 9/2020 | Kobayashi | G08G 1/22 |
| 2020/0300649 A1* | 9/2020 | Kim | G08G 1/202 |
| 2021/0043090 A1* | 2/2021 | Park | H04W 4/08 |
| 2021/0118307 A1* | 4/2021 | Kim | G08G 1/22 |
| 2021/0333115 A1* | 10/2021 | Deselaers | G01C 21/3691 |

OTHER PUBLICATIONS

Disclosed Anonymously, "System for automatic trip collaboration between autonomous vehicles", An IP.com Prior Art Database Technical Disclosure, IP.com No. IPCOM000254970D, IP.com Electronic Publication Date: Aug. 17, 2018, 7 pages.

* cited by examiner

COORDINATION MANAGEMENT OF MULTIPLE VEHICLES

BACKGROUND OF THE INVENTION

The present invention relates generally to the field path planning, machine learning, computer vision and artificial intelligence, and more particularly to coordinating the traveling of multiple vehicles.

An automotive navigation system is part of the automobile controls or a third-party add-on used to find direction in an automobile. An automotive navigation system typically uses a satellite navigation device utilizing global positioning system (GPS) to get its position data which is then correlated to a position on a road. When directions are needed, routing can be calculated by the automotive navigation system. On the fly traffic information can be used to adjust the route. Dead reckoning using distance data from sensors attached to the drivetrain, a gyroscope and an accelerometer can be used for greater reliability, as GPS signal loss and/or multipath can occur due to urban canyons or tunnels. Mathematically, automotive navigation is based on the shortest path problem, within graph theory, which examines how to identify the path that best meets some criteria (shortest, cheapest, fastest, etc.) between two points in a large network.

Path-planning is an important basic component for autonomous mobile robots that enables robots to find the shortest or otherwise optimal path between two points. Optimal paths could be paths that minimize the amount of turning or the amount of braking. An optimal path may take on the form of whatever a specific application requires. Algorithms to find a shortest path are important not only in robotics, but also in network routing, video games and gene sequencing. Path-planning requires a map of the environment and the robot to be aware of its location with respect to the map.

SUMMARY

Embodiments of the present invention disclose a method, a computer program product, and a system for coordinating travel of multiple vehicles traveling to a target destination, the embodiments comprise: generating a travel group by presenting travel group members with a group code for use in a GPS application being used by each travel group member, wherein the GPS application automatically syncs the travel group members together; receiving travel group parameters from the travel group members, the synced GPS applications, and a weather application; generating a course of travel for the travel group members to reach a destination wherein each GPS application directs the travel group members along the course of travel; tracking each travel group member according to locations identified by the synced GPS applications; determining that a subgroup of the travel group is no longer traveling within a pre-determined range of other travel group members; calculating an optimized course of travel for the subgroup to reunite with the other travel group members based on real-time traffic data, real-time weather data, and the travel group parameters, wherein the optimized course of travel includes the shortest course for the subgroup to travel to be within the pre-determined range of the other travel group members at a specified time; adjusting the course of travel to include the optimized course for the subgroup and a revised course of travel for the other travel group members; and causing each GPS application to direct the subgroup to travel according to the optimized course of travel and the other travel group members to travel according to the revised course of travel.

DETAILED DESCRIPTION

Figure 1:
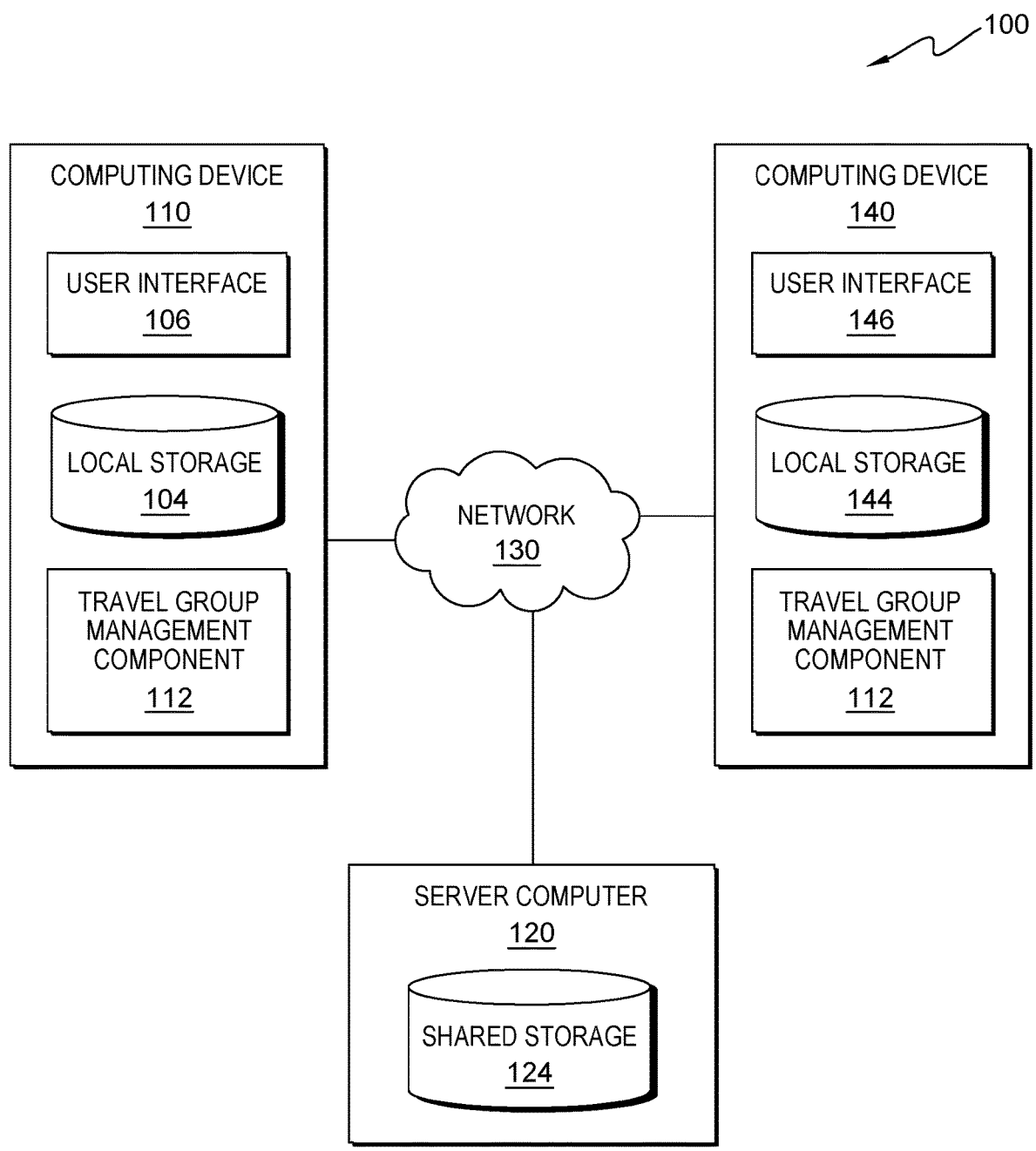
FIG. 1 is a functional block diagram illustrating a distributed data processing environment, in accordance with an embodiment of the present invention.

The need to travel by multiple vehicles at one time often arises when a group of people want to arrive at a same location together. Multi-vehicle groups are sometimes arranged for this purpose. However, with current growing suburban and urban cities, dense traffic conditions, and from the varying needs of persons in the group and other drivers on the road result in the multi-vehicle group being split up and loosing track of each other. Embodiments of the present invention enable a travel group of vehicles (i.e., two or more vehicles) to keep driving without having to wait for the lost travel group members. Embodiments of the present invention can generate an optimized course of action (i.e., course) for drivers who have lost the travel group. The course of action may include short cut routes and travel speed suggestions. Some embodiments of the present invention are directed to developing a mutual course of action to both the lost vehicle and the rest of the travel group that remains together. That is, the group remaining together may be directed by the course of action to reduce speed or to take a longer route that would ensure the lost vehicle arrive at the destination at the same time as the lost vehicle. While stopping along the way is usually an undesirable approach, the course of action may include instructions to stop at a designated location and await arrival of the lost vehicle. The optimized course enables the lost or separated drivers to rejoin the travel group as the rest of the travel group continues the trip without having to stop and wait for the lost or separated drivers. Embodiments of the present invention can generate an optimized course for a lost driver of a travel group, so the lost driver of the travel group arrives at the target location at the same time as the rest of the travel group.

Embodiments of the present invention can pair the vehicles of the travel group together based on travel group parameters such as target destination, desired time of arrival, participating vehicles, target destination, constraints (e.g., avoid tolls, avoid bridges, avoid tunnels, etc.), traffic and weather conditions, etc. Embodiments of the present invention can dynamically update road map and GPS positions of the vehicles in the travel group during the trip. In various embodiments of the present invention, once one or more vehicles or subgroups get separated from the travel group embodiments of the present invention can calculate an optimized course to reunite all vehicles of the travel group into a single group. An optimized course is the shortest and/or fastest course to reach a destination (e.g., rejoining the travel group or arriving to the target destination). Embodiments of the present invention can generate and display real-time updated driving instructions to the drivers. Embodiments of the present invention can keep track of each vehicle or subgroup associated with the travel group and keep the other members updated on the location of the other vehicles. Embodiments of the present invention can enable other travel group members to travel freely without having to stop and wait for other travel group members who have fallen behind. Embodiments of the present invention enable all the vehicles of a travel group to arrive at the target destination at approximately the same time or within a short window time.

Embodiments of the present invention comprise advantages and improvements to the current art of vehicle navigation using mobile navigation applications and course planning and more specifically multiple vehicle navigation and course planning using mobile navigation applications. Embodiments of the present invention improve the current art by enabling members of a travel group, after being separated from the travel group, to rejoin the moving travel group by generating an optimized turn-by-turn navigation course that enables the travel group to keep moving toward the target destination without having to stop and wait for the lost or left behind vehicles of the travel group, which minimizes the overall travel time and enables all the vehicles of the travel group to arrive together or within a predetermined difference in time to the target destination. Additionally, embodiments of the present invention improve the current art by enabling a completely automated and integrated GPS for vehicles or mobile phones.

Embodiments of the present invention improve autonomous vehicles and traditional vehicles by generating optimized courses for multiple vehicles traveling in a travel group to reach a target destination without having to wait for vehicles in the travel group who get lost or fall behind. Embodiments of the present invention can enhance autonomous vehicle technology by enabling autonomous travel in a travel group. Embodiments of the present invention enables the travel group to reach a target destination more efficiently by instituting a multi-agent moving target search whose solution enables embodiments of the present invention to find optimized routes to catch up (i.e., reunite) with the lead subgroup which is currently closest to the target destination, without having any of the vehicles in the travel group stop and wait for vehicles in the travel group that have fallen behind.

A vehicle is any form of motorized or manual transportation that can be used to transport items, objects, or people.

The terms driver and user can be interchangeable herein. Both terms driver and user can represent a member, wherein a member comprises the same meaning as a driver and a user. A member is a driver/user of a vehicle in a travel group.

A travel group is a group of two or more vehicles traveling together to a selected or predetermined target destination (e.g., caravan, procession). A travel group is made up of subgroups, wherein a subgroup comprises one or more vehicles and vice-versa.

The term course, or plan, can mean a navigation path (i.e., path), navigation route, and/or navigation instructions (such as speed, waiting period, waiting location).

It should be noted herein that in the described embodiments, participating parties have consented to being recorded, track, and/or monitored, and participating parties are aware of the potential that such recording tracking and/or monitoring may be taking place. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 3).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, computing device 140, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, computing device 140, and server computer 120, and any other computing devices and/or storage devices (not shown in FIG. 1) within distributed data processing environment 100.

In some embodiments of the present invention, computing device 110 and computing device 140 can each be, but are not limited to, a standalone device, a client server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 and computing device 140 can each be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 and computing device 140 can each represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 and computing device 140 can each include an instance of user interface (interface) 106, local storage 108, and/or user travel group management component (travel group manager) 112. In various embodiments, not depicted in FIG. 1, computing device 110 and computing device 140 can each comprise one or more cameras. In various embodiments, the one or more cameras can be low light cameras. In other embodiments, the one or more cameras can be any type of camera known in the art. In various embodiments, not depicted in FIG. 1, computing device 110 and computing device 140 can each have a plurality of user interfaces. In other embodiments, not depicted in FIG. 1, distributed data processing environment 100 can comprise a plurality of computing devices, plurality of server computers, and/or one a plurality of networks. Computing device 110 and computing device 140 can each include internal and external hardware components, as depicted, and described in further detail with respect to FIG. 5.

User interface (interface) 106 provides an interface to travel group manager 112 on computing device 110. Interface 106, can enable a user and/or a client to interact with travel group \travel group manager 112, computing device 110 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces (e.g., application user interfaces (UI)), and instructions for operation. interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data, collect data and/or receive data.

Interface 146 provides an interface to travel group manager 112 on computing device 140. Interface 146, can enable a user and/or a client to interact with travel group manager 112, computing device 140 and/or server computer 120 in various ways, such as sending program instructions, receiving program instructions, sending and/or receiving messages, updating data, sending data, inputting data, editing data, collecting data, and/or receiving data. In one embodiment, interface 146 can be a graphical user interface (GUI) or a web user interface (WUI) and can display at least text, documents, web browser windows, user options, application interfaces (e.g., application user interfaces (UI)), and instructions for operation. interface 146 can include information (such as graphic, text, and sound) presented to a user and control sequences the user employs to control operations. In another embodiment, interface 146 can be a mobile application software providing an interface between a user of computing device 140 and server computer 120. Mobile application software, or an "app," can be designed to run on smart phones, tablet computers and other computing devices. In an embodiment, interface 146 can enable the user of computing device 140 to at least send data, input data, edit data, collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 5.

Each of shared storage 124, local storage 144, and local storage 108 can be a data/knowledge repository and/or a database that can be written and/or read by one or a combination of travel group manager 112, server computer 120, computing device 140, and computing device 110. In the depicted embodiment, shared storage 124 resides on server computer 120, local storage 108 resides on computing device 140, and local storage 108 resides on computing device 110. In another embodiment, shared storage 124, local storage 144, and/or local storage 108 can reside elsewhere within distributed data processing environment 100, provided that each can access and is accessible by computing device 110 and server computer 120. Shared storage 124, local storage 144, and/or local storage 108 can each be implemented with any type of storage device capable of storing data and configuration files that can be accessed and utilized by server computer 120, such as, but not limited to, a database server, a hard disk drive, or a flash memory.

In some embodiments of the present invention, shared storage 124, local storage 144, and/or local storage 108 can each be a hard drive, a memory card, a computer output to laser disc (cold storage), and/or any form of data storage known in the art. In some embodiments, shared storage 124, local storage 144, and/or local storage 108 can each be one or more cloud storage systems and/or databases linked to a cloud network. In various embodiments, shared storage 124, local storage 144, and/or local storage 108 can each access, store, and/or house capture user activity, selected videos, and/or data shared throughout distributed data processing environment 100.

In the depicted embodiment of the present invention, travel group manager 112 is executed on computing device 110 and computing device 140. In the depicted embodiment, travel group manager 112 is in electronic communication with computing device 110, computing device 140, and/or server computer 120 via network 130. Alternatively, travel group manager 112 is executed on server computer 120. Alternatively, travel group manager 112 can be located and/or executed anywhere within distributed data processing environment 100. Alternatively, travel group manager 112 executes on a GPS mobile application integrated on a vehicles dashboard, computer system, or a user's personal computing device (e.g., computing device 110 and/or computing device 140). In various embodiments of the present invention, travel group manager 112 can be integrated with any mobile GPS/Navigation application known in the art. In various embodiments of the present invention, travel group manager 112 can sync each travel group member's computing device (e.g., computing device 110 and computing device 140) via any form of long or short range communication known in the art (e.g., network 130). In some embodiments of the present invention, travel group manager 112 can coordinate multiple optimized courses for multiple subgroups in a travel group. In various embodiments of the present invention, travel group manager 112 can automatically parse a travel group into subgroups based on the location of vehicles in relation to the travel group leader (i.e., the vehicle that is in front of all the other vehicles in the travel group or the vehicle that is closest to the target destination).

In various embodiments of the present invention, if one or more vehicles get separated from the travel group then travel group manager 112 can calculate an optimized course for the one or more vehicles (i.e., subgroup) to reunite all vehicles of the travel group into a single group. An optimized course is the shortest and/or fastest course to reach a destination (e.g., rejoining the travel group or arriving at the target destination). In various embodiments of the present invention, travel group manager 112 can generate an optimized course for each individual vehicle or subgroup that is separated from the travel group. In various embodiments of the present invention, travel group manager 112 can generate and display real-time updated driving instructions to the drivers of the vehicles in the travel groups. In various embodiments of the present invention, travel group manager 112 can keep track of each vehicle or subgroup associated with the travel group and keep the other travel group members updated on the location of the other vehicles in the travel group. For example, each member can receive location information of each member of the travel group (location indicator displayed on the navigation system), target destination arrival time for each member/vehicle of the travel group, each travel group member/vehicles route, wherein each vehicle or subgroup's route can be displayed on each member of the travel groups navigation system, etc.

In various embodiments of the present invention, travel group manager 112 can generate and issue notifications and/or responsive user prompts to each member of the travel group or to the leader of the travel group if one or more vehicles (i.e., subgroups) get separated from the travel group, wherein the one or more vehicles or subgroups exceed a predetermined amount of distance from the other vehicles in the travel group or the arrival time of one or more vehicles is delayed by a predetermined amount of time. For example, there are 3 vehicles in the travel group (V1, V2, and V3) and a member of the travel group, V3, falls 15 miles behind V1 and V2, or V3's estimated arrival time to the target destination is delayed 30 minutes (i.e., is estimated to arrive 30 minutes later than the rest of the travel group) then travel group manager 112 can generate and issue a notification prompt on each members navigation system (e.g., computing device 110 and computing device 140) indicating that V3 is 15 miles behind the travel group or that V3 will arrive to the target destination 30 minutes after V1 and V2. In this example, travel group manager displays a responsive prompt to V1 and V2, via interface 106 and interface 146, to either wait for V3 or to continue traveling. In another example, if V3's estimated arrival time to the target destination is delayed 30 minutes (i.e., is estimated to arrive 30 minutes later than the rest of the travel group) then travel group manager 112 can generate and issue a notification prompt to each member of the travel group indicating that V3 will arrive to the target destination 30 minutes after V1 and V2.

In various embodiments of the present invention, travel group manager 112 can only send a generated prompt related to travel group member status to the travel group leader. In various embodiments of the present invention, travel group manager 112 can enable members of a travel group to select a leader by simply naming or otherwise selecting a member of the group. In various embodiments of the present invention, travel group manager 112 can generate and display a responsive questionnaire prompt with each member of the travel group listed on each members computing device 110 that asks each member to select a leader, wherein the member that receives the most selections (i.e., votes) is named the leader of the travel group. In other embodiments of the present invention, travel group manager 112 can automatically select a leader based on the position/location of the vehicles in the travel group. For sub-groups that depart from the main travel group, additional leaders may be selected for managing the sub-group of vehicles.

For example, if V1, V2, and V3 are traveling in a travel group and V2 is in front of V1 and V3 or is closest to the target destination (i.e., V2 is leading V1 and V3) then travel group manager 112 will name V2 the leader. In various embodiments of the present invention, travel group manager 112 can dynamically change the leader based on the location of the vehicles in the travel group. For example, if V1, V2, and V3 are traveling in a travel group and V2 is in front of V1 and V3 then travel group manager 112 will name V2 the leader. In this example, if V3 moves in front of V1 and V2 then travel group manager 112 will name V3 the new leader. In one embodiment of the present invention, travel group manager 112 can enable a user to create a group (i.e., a travel group). In this particular embodiments, travel group manager 112 enables the creator of the group to select a leader and/or invite other users to join the created group by sending text messages or electronic mail (e-mail) invites embedded with a hyperlink and/or randomly generated group code. In this particular embodiment, travel group manager 112 can enable the leader or creator of the group name the travel group. In various embodiments of the present invention, when a user joins a travel group then travel group manager 112 can automatically sync each travel group member's computing device (e.g., computing device 110 and computing device 140) and/or GPS application via any form of long or short range communication known in the art (e.g., network 130).

In various embodiments of the present invention, travel group manager 112 can enable users (i.e., travel group members) to name themselves or their vehicles. In other embodiments of the present invention, travel group manager 112 can assign predetermined or pre-generated default names to each member of the travel group (e.g., V1, V2, etc.). In various embodiments of the present invention, travel group manager 112 enables the travel group members to participate in a group chat. In various embodiments of the present invention, travel group manager 112 can display each member on each navigation system of the travel group (i.e., location is shared with other travel group members). For example, travel group manager 112 shares the location of all the travel group members with each member of the travel group and displays the members locations on each members navigation system in real-time. In this example, travel group manager 112 shares and displays any updated or optimized route and estimated time of arrival (ETA) with each GPS in the travel group. In this example, each member of the travel group is randomly assigned a color (e.g., red, blue, orange, pink, etc). Alternatively, each member of the travel group is assigned a color indicator on the GPS/ navigation system (e.g., green represents no delay, yellow represents a slight delay, red represents a vehicle or subgroup with a significant delay), wherein a delay or significant delay is determined by exceeding predetermined threshold of arrival time. In various embodiments of the present invention, travel group manager 112 enables users to select a color for their navigation route that is displayed on each members GPS. In various embodiments of the present invention, travel group manager 112 only shares and displays the location of all the members to the leader of the travel group.

Embodiments of the present invention can enable other travel group members to travel freely without having to stop and wait for other travel group members who have fallen behind. Embodiments of the present invention enable all the vehicles of a travel group to arrive at the target destination at the same time or within a short time window of time. In various embodiments of the present invention, travel group manager 112 frequently reports a vehicles current GPS coordinates to a server. In various embodiments of the present invention, travel group manager 112 the GPS coordinates sent to the server can be relayed to other members in the travel group or just to the group leader. In various embodiments of the present invention, travel group members don't have to start at the same location (i.e., each member of the travel group can start the trip in different locations). In various embodiments of the present invention, travel group manager 112 can frequently infer the number and the structure of subgroups based on the distance between vehicles, and whether they are on the same road or not.

For example, travel group manager can continuously calculate and determine how many subgroups are present in a travel group based on the GPS location of each vehicle in the travel group (V1, V2, V3, V4, and V5). In this example, V3 and V1 are leading the travel group and are within a predetermined range of each other while V4 and V2 are within a predetermined range of each other and are behind of V3 and V1 but both V4 and V2 are ahead of V5 by an exceeded predetermine range. In this example, travel group manager 112 identifies V3 and V1 to be subgroup 0, V4 and V2 to be subgroup 1, and V5 to be subgroup 2.

A subgroup is one or more vehicles that are part of the travel group that have fallen a predetermined distance behind the lead subgroup (i.e., leader) or one or more vehicles that. In various embodiments of the present invention, when two or more subgroups are detected the travel group manager 112 can trigger the reuniting procedure. For example, if a travel group comprising V1, V2, V3, V4, and V5 split into two subgroups (e.g., subgroup 0=V2, V3, and V5 and subgroup 1=V1 and V4) because V1 and V4 exceed a predetermined distance from V2, V3 and V5 then travel group manager 112 will trigger the reuniting procedure by sending responsive notification prompts to subgroup 0 (V2, V3, and V5) and generating an optimized course for V1 and V4. In various embodiments of the present invention, travel group manager 112 enables users to dynamically log out from the travel group, in which case the user will be excluded from any updates.

In various embodiments of the present invention, travel group manager 112 can dynamically reunite a travel group by:
generating a candidate plan P_0_k for the subgroup at the front (0=index of the subgroup, k=iteration, and P=plan), wherein k=0 to Kmax. Kmax is a preset constant for the maximum number of iterations.

A plan (i.e., course) contains: a route, speed for various segments of the route, park-and-wait instructions (where, for how long), if needed, and using as inputs consisting of, but not limited to: map, current positions/speeds, and solutions S_0_1 from previous iterations l<k if available. S_0_1 is a solution from previous iterations where l<k.

For each remaining subgroup travel group manager 112 can generate a plan (P_j_k) to reunite, wherein P_j_k is a course (i.e., plan) for subgroup j in iteration k and:
plan (p)=route+speed; j=subgroup; and k=iteration
In various embodiments of the present invention, travel group manager 112 can assume that the leading subgroup uses plan P_0_k. In various embodiments of the present invention, travel group manager 112 can use a moving target search to reunite one or more subgroups with the leading subgroup, wherein a subgroup comprises:
S_j_k (j>0)
In various embodiments of the present invention, travel group manager 112 can evaluate global solution S_k (combined plans of all subgroups) based on quality metrics. For example, one way of defining a quality metric is by minimizing the time to rejoin (i.e., reunite) the travel group. Other quality metrics include a consideration of a time range for some subgroups to reunite with other subgroups, or constraints about the speed, etc. In various embodiments of the present invention, travel group manager 112 can break loop when one or more global solutions satisfy the quality metrics.

In various embodiments of the present invention, travel group manager 112 can select one or more generated global solutions. In various embodiments of the present invention, travel group manager 112 can output the select global solution and display the selected solution to all vehicles in the travel group. Quality metrics comprise, but are not limited to: member and/or travel group arrival time at the destination, cost splitting, total duration that vehicles are divided into subgroups, cost of violating preferences, (e.g. prefer not to park and wait, prefer not to reduce speed below a given threshold, prefer not to deviate too much from optimal route, and prefer not to go through tolls), etc. In various embodiments of the present invention, travel group manager 112 can enable multi-objective optimization. For example, each vehicle or subgroup receives an optimized course. In various embodiments of the present invention, travel group manager 112 can combine several criteria into one single cost number (e.g., weighted sum).

In various embodiments of the present invention, travel group manager 112 can organize road trips of multiple vehicles. In various embodiments of the present invention, travel group manager 112 can track devices and a user interface for a plurality of vehicles, and at least one computing device. In various embodiments of the present invention, travel group manager 112 receives travel group parameter inputs: the participating vehicles, destination, constraints, road map and GPS positions of the vehicles updated dynamically during the trip, and/or traffic and weather conditions. In various embodiments of the present invention, travel group manager 112 can output optimized driving directions travel group to all or a subset of user interfaces installed in each vehicle or subgroup that enable travel group members to reunite or maintain the travel group or subgroup.

In various embodiments of the present invention, if travel group manager 112 determines that at least one of the vehicles is autonomous and that the autonomous vehicle does not need a user interface then travel group manager 112 can enable the autonomous vehicle to consume the driving directions directly. In various embodiments of the present invention, travel group manager 112 can optimize the route/course for a subgroup to reunite with the travel group. In various embodiments of the present invention, travel group manager 112 can collect and account for constraints of acceptable maneuvers to rejoin the travel group. In various embodiments of the present invention, travel group manager 112 can account for each vehicles or subgroups current situation (e.g. current location, compositions of split groups of the travel group, etc.). In various embodiments of the present invention, travel group manager 112 can receive or retrieve, travel group parameters as an input, the current locations of the vehicles in the travel group, the pairings of the vehicles in the travel group, the target destination(s), current road conditions, weather, etc.

In various embodiments of the present invention, travel group manager 112 can predict the trajectories of the participating vehicles in the travel group. In various embodiments of the present invention, travel group manager 112 can apply search algorithms to find a strategy to reunite the travel group and the corresponding instructions to all the drivers or autonomous vehicles. In various embodiments of the present invention, travel group manager 112 can continuously observe deviations from the optimal course and automatically decide to re-optimize the course if a faster route is determined. In various embodiments of the present invention, travel group manager 112 can take into account a predetermined deadline to reach a target destination and factor in the deadline into the decision about reuniting a split travel group and deciding it is possible to meet the deadline.

Figure 2:
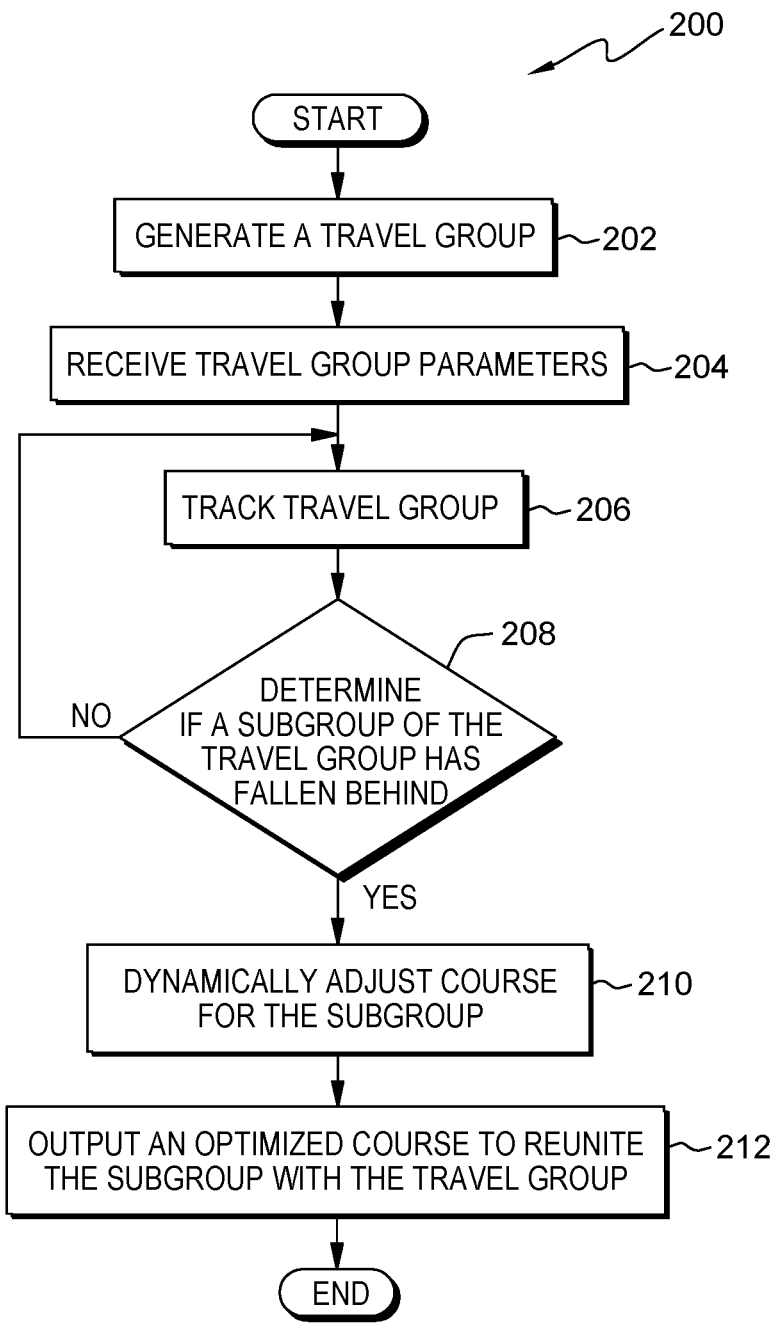
FIG. 2 illustrates operational steps of travel group management component, in communication with a computing device, within the distributed data processing environment of FIG. 1, for coordinating multiple vehicles to a target destination, in accordance with an embodiment of the present invention.

FIG. 2 illustrates operational steps of travel group manager 112, generally designated 200, in communication with computing device 110, within distributed data processing environment 100 of FIG. 1, for coordinating multiple vehicles to a target destination, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, travel group manager 112 generates a travel group. In various embodiments of the present invention, travel group manager 112 can generate a travel group comprising two or more vehicles. In various embodiments of the present invention, a travel group can be made up of subgroups, wherein each subgroup represents one or more vehicles. A subgroup can be predetermined or identified based on the distance between one or more current vehicles in the travel group and any other vehicles in a travel group.

In step 204, travel group manager 112 receives travel group parameters. In various embodiments of the present invention, travel group manager 112 can receive travel group parameters from a user and/or automatically from a linked navigation system and/or weather application. Travel group parameters can be, but are not limited to, the participating vehicles, target destination, constraints (e.g., avoid tolls, avoid bridges, avoid tunnels, etc.), road map and GPS positions of the vehicles updated dynamically during the trip, traffic and weather conditions.

In step 206, travel group manager 112 tracks the travel group. In various embodiments of the present invention, travel group manager 112 can track a travel group and each vehicle in the travel group for the duration of a trip (e.g., until each vehicle reaches of the travel group reaches the target destination).

In step 208, travel group manager 112 determines if a subgroup of the travel group is no longer traveling within a pre-determined range of other travel group members. In various embodiments of the present invention, travel group manager 112 can determine if one or more subgroups is no longer traveling within a pre-determined range of other travel group members (e.g., have fallen behind the rest of the travel group). In various embodiments of the present invention, based on the travel group tracking, if travel group manager 112 determines one or more vehicles have exceeded a predetermined distance from the lead vehicle (leader) or lead subgroup (i.e., the subgroup that is leading the travel group) (Yes step) then travel group manager 112 can determine that a subgroup has fallen behind and will trigger an optimized rerouting course to reunite the subgroup with lead subgroup. In various embodiments of the present invention, travel group manager can identify and label the vehicles that have fallen behind and place each vehicle into a subgroup based on the distance between each vehicle and the lead subgroup or lead vehicle. In various embodiments of the present invention, based on the travel group tracking, if no vehicle exceeds a predetermined distance from the lead vehicle (No step) then travel group manager continuously tracks the travel group until one or more vehicles exceeds a predetermined distance from the lead vehicle or lead subgroup. In various embodiments of the present invention, travel group manager 112 can continuously track a travel group and observe deviations from the optimal course and automatically decide to re-optimize the course if a faster route is determined.

In step 210, travel group manager 112 dynamically adjusts the course for a subgroup the travel group. In various embodiments of the present invention, travel group manager 112 can dynamically adjust the course of a subgroup based on the travel group parameters when a subgroup falls behind the other subgroups or lead subgroup. For example, if a subgroup falls behind then travel group manager reviews the travel group parameters and the live traffic updates to determine an optimized course. In this example, the rest of the travel group is 30 minutes ahead but is stuck in traffic on the highway. In this example, travel group manager 112 dynamically adjusts the subgroups course to take the surface streets and backroads in order for the subgroup to reunite to the rest of the travel group.

In step 212, travel group manager 112 outputs an optimized course to reunite the subgroup with the travel group. In various embodiments of the present invention, travel group manager 112 can generate and output an optimized course for a subgroup that has fallen behind so the subgroup can reunite with the rest of the travel group or the lead subgroup. The optimized course can take different a different route that is identified to be faster than the course the rest of the travel group is taking based on the travel group parameters.

Figure 3:
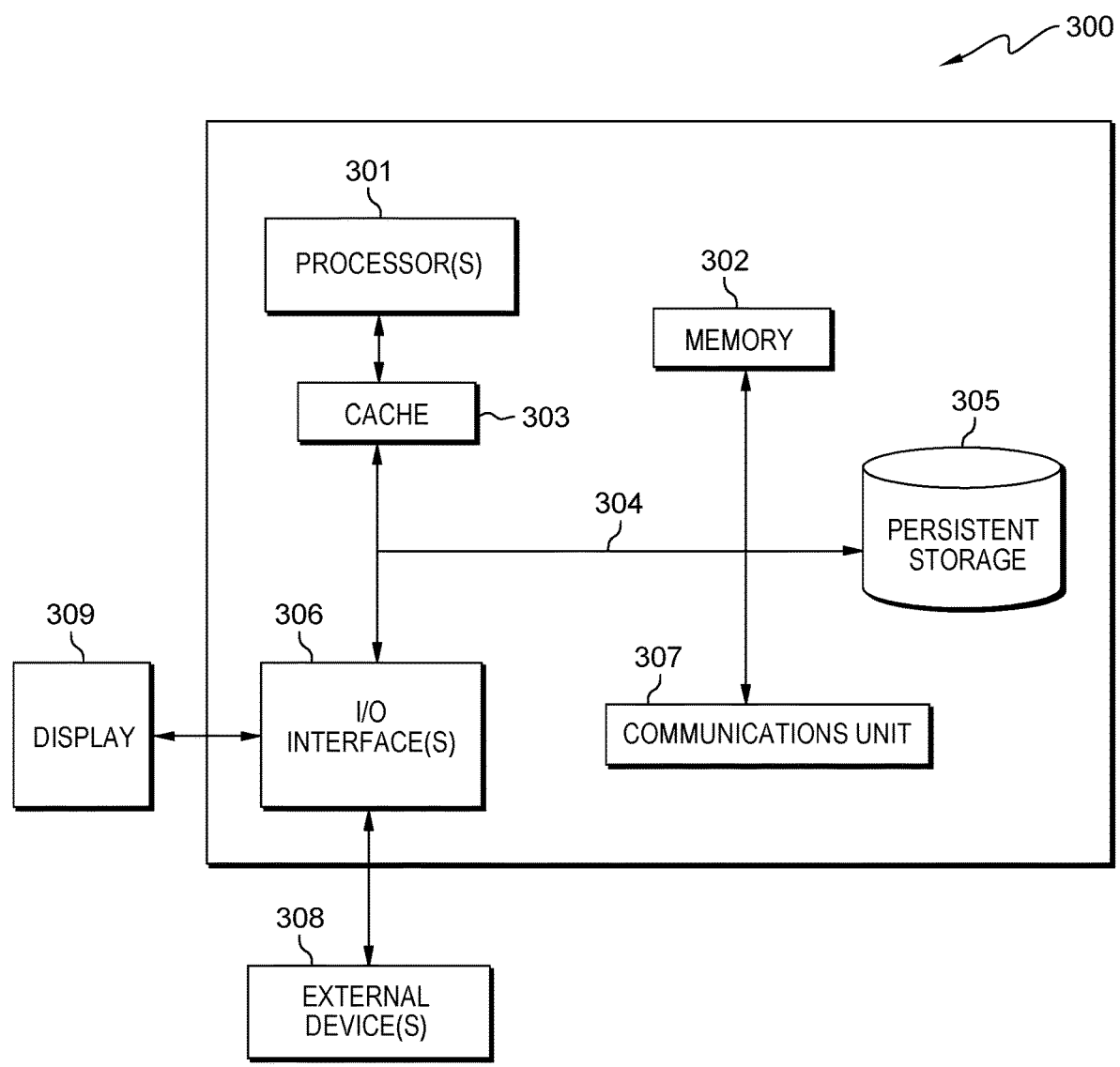
FIG. 3 depicts a block diagram of components of a computing device executing the travel group management component within the distributed data processing environment of FIG. 1, in accordance with an embodiment of the present invention.

FIG. 3 depicts computer system 300, where computing device 110 represents an example of computer system 300 that includes travel group manager 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for coordinating travel of multiple vehicles traveling to a target destination, the method comprising:
    generating a travel group by presenting travel group members with a group code for use in a GPS application being used by each travel group member, wherein the GPS application automatically syncs the travel group members together;
    receiving travel group parameters from the travel group members, the synced GPS applications, and a weather application;
    pairing travel group members based on the received travel group parameters;
    generating a primary course of travel for the travel group members to reach the target destination wherein each GPS application directs the travel group members along the primary course of travel;
    tracking each travel group member according to locations identified by the synced GPS applications;
    determining that a subgroup of the travel group is no longer traveling within a pre-determined range of the travel group members, wherein a number and a structure of the subgroups are inferred based on the distance between vehicles and a road the vehicles are currently traveling on;
    selecting a leader of the subgroup to manage the subgroup until the subgroup is reunited with the travel group;
    responsive to determining the subgroup is no longer traveling within a pre-determined range of the travel group members, generating a secondary optimized course of travel for the subgroup so the subgroup arrives at the target destination at the same time as the travel group by calculating the secondary optimized course of travel for the subgroup to reunite with the travel group members based on real-time traffic data, real-time weather data, and the travel group parameters, wherein the secondary optimized course of travel includes the shortest course for the subgroup to travel to be within the pre-determined range of the travel group members at a specified time and travel speed suggestions;
    directing each of the GPS applications in the subgroup to travel according to the secondary optimized course of travel and each of the GPS in the travel group members to maintain the primary course of travel; and
    directing the travel group members in the travel group, through a responsive prompt, to delay each of the vehicles by a predetermined amount of time.

2. The computer-implemented method of claim 1 further comprising:
    displaying real-time updated driving instructions to the drivers of the vehicles in the travel groups.

3. The computer-implemented method of claim 1 further comprising:
    generating responsive user prompts to the travel group members when the subgroup exceeds a predetermined distance from the travel group members or subgroups or an arrival time of the subgroup is delayed by a predetermined amount of time.

4. The computer-implemented method of claim 1 further comprising:
dynamically changing a travel group leader based on a location of the vehicles in the travel group, wherein the leader is the vehicle that is the closest to the target destination.

5. The computer-implemented method of claim 1 further comprising:
selecting a travel group leader by issuing a vote between the travel group members, wherein selecting the travel group leader comprises:
generating a responsive questionnaire prompt to each member of the travel group that asks each member to select a leader, wherein the member that receives the most votes is named the travel group leader.

6. The computer-implemented method of claim 1 further comprises:
continuously observing deviations from the optimized course; and
automatically deciding to re-optimize the travel group's course if a faster route is determined.

7. The computer-implemented method of claim 1 further comprising:
sharing the location of a travel group member's location with the travel group members;
displaying the travel group member's location on the travel group members navigation system in real-time, wherein each travel group member is randomly assigned a color.

8. A computer program product for coordinating travel of multiple vehicles traveling to a target destination, the computer program product comprising:
one or more computer readable storage devices and program instructions stored on the one or more computer readable storage devices, the stored program instructions comprising:
program instructions to generate a travel group by presenting travel group members with a group code for use in a GPS application being used by each travel group member, wherein the GPS application automatically syncs the travel group members together;
program instructions to receive travel group parameters from the travel group members, the synced GPS applications, and a weather application;
program instructions to pair the travel group members based on the received travel group parameters;
program instructions to generate a primary course of travel for the travel group members to reach the target destination wherein each GPS application directs the travel group members along the primary course of travel;
program instructions to track each travel group member according to locations identified by the synced GPS applications;
program instructions to determine that a subgroup of the travel group is no longer traveling within a pre-determined range of the travel group members, wherein a number and a structure of the subgroups are inferred based on the distance between vehicles and a road the vehicles are currently traveling on;
program instructions to select a leader of the subgroup to manage the subgroup until the subgroup is reunited with the travel group;
responsive to determining the subgroup is no longer traveling within a pre-determined range of the travel group members, program instructions to generate a secondary optimized course of travel for the subgroup so the subgroup arrives at the target destination at the same time as the travel group by calculating the secondary optimized course of travel for the subgroup to reunite with the travel group members based on real-time traffic data, real-time weather data, and the travel group parameters, wherein the secondary optimized course of travel includes the shortest course for the subgroup to travel to be within the pre-determined range of the travel group members at a specified time and travel speed suggestions;
program instructions to direct each of the GPS applications in the subgroup to travel according to the secondary optimized course of travel and each of the GPS in the travel group members to maintain the primary course of travel; and
program instructions to direct the travel group members in the travel group, through a responsive prompt, to delay each of the vehicles by a predetermined amount of time.

9. The computer program product of claim 8 further comprising:
program instructions to display real-time updated driving instructions to the drivers of the vehicles in the travel groups.

10. The computer program product of claim 8 further comprising:
program instructions to generate responsive user prompts to the travel group members when the subgroup exceeds a predetermined distance from the travel group members or subgroups or an arrival time of the subgroup is delayed by a predetermined amount of time.

11. The computer program product of claim 8 further comprising:
program instructions to dynamically change a travel group leader based on a location of the vehicles in the travel group, wherein the leader is the vehicle that is the closest to the target destination.

12. The computer program product of claim 8 further comprising:
program instructions to select a travel group leader by issuing a vote between the travel group members, wherein selecting the travel group leader comprises:
program instructions to generate a responsive questionnaire prompt to each member of the travel group that asks each member to select a leader, wherein the member that receives the most votes is named the travel group leader.

13. The computer program product of claim 8 further comprises:
program instructions to continuously observe deviations from the optimized course; and
program instructions to automatically decide to re-optimize the travel group's course if a faster route is determined.

14. The computer program product of claim 8 further comprising:
program instructions to share the location of a travel group member's location with the travel group members;
program instructions to display the travel group member's location on the travel group members navigation system in real-time, wherein each travel group member is randomly assigned a color.

15. A computer system for coordinating travel of multiple vehicles traveling to a target destination, the computer system comprising:

one or more computer processors;
one or more computer readable storage devices;
program instructions stored on the one or more computer readable storage devices for execution by at least one of the one or more computer processors, the stored program instructions comprising:
   program instructions to generate a travel group by presenting travel group members with a group code for use in a GPS application being used by each travel group member, wherein the GPS application automatically syncs the travel group members together;
   program instructions to receive travel group parameters from the travel group members, the synced GPS applications, and a weather application;
   program instructions to pair the travel group members based on the received travel group parameters;
   program instructions to generate a primary course of travel for the travel group members to reach the target destination wherein each GPS application directs the travel group members along the primary course of travel;
   program instructions to track each travel group member according to locations identified by the synced GPS applications;
   program instructions to determine that a subgroup of the travel group is no longer traveling within a pre-determined range of the travel group members, wherein a number and a structure of the subgroups are inferred based on the distance between vehicles and a road the vehicles are currently traveling on;
   program instructions to select a leader of the subgroup to manage the subgroup until the subgroup is reunited with the travel group;
   responsive to determining the subgroup is no longer traveling within a pre-determined range of the travel group members, program instructions to generate a secondary optimized course of travel for the subgroup so the subgroup arrives at the target destination at the same time as the travel group by calculating the secondary optimized course of travel for the subgroup to reunite with the travel group members based on real-time traffic data, real-time weather data, and the travel group parameters, wherein the secondary optimized course of travel includes the shortest course for the subgroup to travel to be within the pre-determined range of the travel group members at a specified time and travel speed suggestions;
   program instructions to direct each of the GPS applications in the subgroup to travel according to the secondary optimized course of travel and each of the GPS in the travel group members to maintain the primary course of travel; and
   program instructions to direct the travel group members in the travel group, through a responsive prompt, to delay each of the vehicles by a predetermined amount of time.

16. The computer system of claim 15 further comprising:
program instructions to generate responsive user prompts to the travel group members when the subgroup exceeds a predetermined distance from the travel group members or subgroups or an arrival time of the subgroup is delayed by a predetermined amount of time.

17. The computer system of claim 15 further comprising:
program instructions to dynamically change a travel group leader based on a location of the vehicles in the travel group, wherein the leader is the vehicle that is the closest to the target destination.

18. The computer system of claim 15 further comprising:
program instructions to select a travel group leader by issuing a vote between the travel group members, wherein selecting the travel group leader comprises:
   program instructions to generate a responsive questionnaire prompt to each member of the travel group that asks each member to select a leader, wherein the member that receives the most votes is named the travel group leader.

19. The computer system of claim 15 further comprises:
program instructions to continuously observe deviations from the optimized course; and
program instructions to automatically decide to re-optimize the travel group's course if a faster route is determined.

20. The computer system of claim 15 further comprising:
program instructions to share the location of a travel group member's location with the travel group members;
program instructions to display the travel group member's location on the travel group members navigation system in real-time, wherein each travel group member is randomly assigned a color.

* * * * *